United States Patent
Nielsen

(12) 
(10) Patent No.: US 6,187,263 B1
(45) Date of Patent: Feb. 13, 2001

(54) METHOD OF IMPROVING INDOOR AIR QUALITY BY THERMALLY INACTIVATING FUNGI ON BUILDING SURFACES

(75) Inventor: Klaus Nielsen, Kokkedal (DK)

(73) Assignee: Micro Clean A/S (DK)

( * ) Notice: Under 35 U.S.C. 154(b), the term of this patent shall be extended for 0 days.

(21) Appl. No.: 09/117,784

(22) PCT Filed: Feb. 7, 1998

(86) PCT No.: PCT/DK97/00053

§ 371 Date: Aug. 7, 1998

§ 102(e) Date: Aug. 7, 1998

(87) PCT Pub. No.: WO97/28685

PCT Pub. Date: Aug. 14, 1997

(30) Foreign Application Priority Data

Feb. 8, 1996 (EP) .................................................. 96610005

(51) Int. Cl.⁷ ....................................................... A61L 2/08
(52) U.S. Cl. ................................................ 422/26; 422/38
(58) Field of Search ..................................... 422/1, 26, 38

(56) References Cited

U.S. PATENT DOCUMENTS 5,378,086  1/1995  Campbell .

FOREIGN PATENT DOCUMENTS

| 33 38848 | 5/1985 | (DE) . |
| 03 55765 | 2/1990 | (EP) . |
| 2111189 * | 6/1983 | (GB) . |
| 92 18716 | 10/1992 | (WO) . |

* cited by examiner

Primary Examiner—Robert J. Warden, Sr.
(74) Attorney, Agent, or Firm—Hunton & Williams

(57) ABSTRACT

A method of improving the indoor air quality in a building comprising at least partially inactivating fungal mycelia and spores associated with a building material surface by applying onto the surface thermal energy initially contained in water vapour at a pressure exceeding 1 bar, in an amount which is sufficient to at least partially inactivate said fungal mycelia and spores but essentially without causing damages to the surface material.

26 Claims, No Drawings

METHOD OF IMPROVING INDOOR AIR QUALITY BY THERMALLY INACTIVATING FUNGI ON BUILDING SURFACES

FIELD OF THE INVENTION

The present invention pertains to improving indoor air quality by providing a method of reducing the fungal contamination by thermally inactivating fungi present on building material surfaces, including surfaces which are hidden, i.e. readily visible or accessible.

TECHNICAL BACKGROUND AND PRIOR ART

It is well-known that in sufficiently moist or damp conditions almost any building material can become mouldy, i.e. growth of fungi occurs on the surface of the materials, frequently to an extent where the fungal growth becomes visually recognizable optionally in the form of disfigurements on the building material surface.

Development of indoor fungal contamination is influenced by moisture, nutrients, pH, temperature and light, of which moisture is the most important. Fungal growth is predominantly controlled by the water content of the surface of a material and the relative humidity (RH) of the air which has an indirect influence through drying or moistening the material. In case of hygric equilibrium between air and the material, fungal growth is likely to occur when the RH exceeds 76–96% depending on fungal species, temperature, time, composition and hygroscopicity of a material. Fungal species can grow within a rather wide temperature range such as 0 to 40° C., the specific temperature range depending on the species.

Such a high moisture content in buildings typically results from condensation of ambient moisture on cold surfaces, water leakages from plumbing constructions or through leaky roofs or cellar walls, or ventilation rates which are inadequate to remove the moisture in the building. Additionally, high amounts of moisture may be generated directly by occupants or by their activities such as bathing, cleaning or cooking. Thus, high indoor moisture contents are typically found in buildings with a high density of occupants such as in schools, day-care centres and office buildings.

Mouldy buildings are commonly found in areas with temperate or cold climates, since under such climatic conditions, the outdoor/indoor temperature difference is high, in particular during winter. However, such temperature differences will also occur in tropic and subtropic regions during summer where buildings are cooled.

Most building materials are porous. When condensation of water near cold surfaces occurs, the condensed water will be absorbed by the porous surface material. Under these circumstances, the moisture content of the surface material may increase significantly up to highly wet levels not far from saturation. Surface condensation of water vapour is thus considered to be one of the major causes of fungal disfigurements of buildings.

In the present context, the term "buildings" includes buildings where farm animals are kept, such as stables, cowsheds, studs, barns and premises for keeping pigs. The climatic conditions including the moisture content in such animal premises are frequently such that good conditions for fungal growth are provided which may result in fungal contamination of the surface materials in these premises resulting in a poor indoor quality for human individuals working in such buildings. Accordingly, fungal contamination of animal premises can become a serious occupational health risk for farm labourers. It is contemplated that the present method is very useful for controlling the fungal contamination of the above premises with the objective of improving the indoor quality therein.

Under the above moisture conditions, fungal contamination of indoor building materials may build up to levels which have adverse health implications for those individuals occupying the building. Systemic or local symptoms ascribable to the load of fungal contamination will primarily occur as a result of fungal material or metabolites being released from the contaminated surfaces into the indoor air. During the last decade it has been recognized that a high fungal contamination of indoor air may cause serious health problems. Thus, certain fungal species may influence the immune system negatively or cause serious infections in subjects having an immune deficiency e.g. caused by HIV or by an immunosuppressive treatment such as in cancer patients subjected to chemotherapy or radiotherapy. Additionally, fungi in indoor air may cause allergy symptoms or they may have a direct toxic effect due to the production of toxic metabolites i.e. mycotoxins. One particular pathogenic, toxin-producing fungal species which is often found in moist buildings is *Stachybotrys atra.*

Frequently, however, fungal contamination of indoor air gives rise to a syndrome of more general symptoms of a non-specific nature. This syndrome is referred to by the WHO as Sick Building Syndrome.

The presently available measures to eliminate or control fungal contamination problems in buildings include:

(i) Remediation measures whereby heavily contaminated construction elements are removed, optionally followed by suitable measures to reduce the moisture content to levels which prevent renewed build-up of contamination including improved ventilation and removal of sources of moisture. Obviously, such a measure is very costly.

(ii) Removal of visible fungal growth e.g. by vacuum cleaning followed by applying fungicidal chemicals substances onto the contaminated building material surfaces. Such a method is disclosed in EP-A-355 765 where a quaternary ammonium compound is used for treating interior surfaces and ventilation systems. Other fungicidal substances presently used for controlling fungal contamination of building structures include disodium-octaborate-tetrahydrate, benzalconium chloride and pyrocatechin. The disadvantages of using chemical control of fungal contamination are clearly that the application hereof may have toxic side effects on occupants or give rise to unacceptable off-odours and that those applying the substances need to carry protective garments and devices.

(iii) It is known to destroy attacks in buildings by the dry rot fungus, Merulius lacrymans by treating wood constructions with hot air at about 90° C. which temperature has to be maintained for hours or even days to obtain a wood core temperature of 50–60° C. However, such an extreme thermal treatment cannot be used generally to directly reduce fungal contamination on surfaces of building structures. Such a treatment is costly, and more importantly, such a long-term thermal treatment of building materials will inevitably cause damages to e.g. electrical installations, or it will cause deformations e.g. of plastic based materials and deteriorate glue based joinings.

(iv) It has also been attempted to control fungal growth on building structures by conditioning the air by introducing dry air at a temperature of about 50–60° C. to reduce the indoor moisture content to levels where fungal growth is inhibited. Such a measure is disclosed in DE-A-3 338 848 and EP-A-143 324. However, such a measure is not effective with regard to inactivating the fungal spores, and dried surfaces are more prone to become recontaminated. Furthermore, this measure has to be repeated continuously to be effective and thus, it is costly.

In a recent Danish report on mould fungi in public buildings ("Skimmelsvampe i offentlige bygninger" published by Forlaget Kommuneinformation, 1995) it was concluded that none of the presently available measures for controlling fungal contamination in buildings are acceptable or suitable for the reasons mentioned above, and the report states that the only remaining possibility to control fungal growth in buildings is the replacement of contaminated materials with clean materials. It is currently anticipated that the total costs for such remediation initiatives which need to be taken in public buildings in Denmark may amount to several billion US dollars.

A strong need therefore exists to provide an alternative method of removing and controlling fungal contamination of building structures as a means of improving the indoor air quality in the buildings, which is effective, non-toxic and cost-effective.

It is known to use steam generating apparatuses for conventional cleaning purposes in indoor environments of a normal hygienic standard including residential and industrial buildings such as e.g. food production facilities, which are not suffering from fungal contamination to the extent as is described herein, i.e. not to an extent where occupants suffer from symptoms generally associated with fungal contamination. However, it has not been suggested that the use of water vapour-derived energy provides a useful and effective means of controlling such extensive fungal contamination on building structures.

It has now surprisingly been found that an alternative, cost-effective and safe method of controlling fungal contamination of building structures can be provided which is based on applying a high amount of thermal energy derived from water vapour under pressure onto fungally contaminated building material surfaces for a short period, i.e. seconds or few minutes whereby effective inactivation of fungal mycelia and spores is obtained without damages to the building materials.

SUMMARY OF THE INVENTION

Accordingly, the present invention provides a method of improving the indoor air quality in a building whose occuant(s) has/have symptoms ascribable to fungal contamination, the method comprising at least partially inactivating fungal mycelia and spores associated with a building material surface by applying onto said surface thermal energy initially contained in water vapour at a pressure exceeding 1 bar, in an amount which is sufficient to at least partially inactivate said fungal mycelia and spores but essentially without causing damages to the surface material.

DETAILED DISCLOSURE

The method according to the invention has been developed with the objective of improving the indoor air quality in a building whose occupant(s) has/have symptoms ascribable to fungal contamination. Such symptoms are well-known and include the above "Sick building sickness syndrome" and the so-called "Damp building syndrome". The symptoms associated with such a syndrome include general symptoms such as head aches, fatigue, general malaise, apathy and dizziness and more localized pathological symptoms from mucous membranes in the eyes and the respiratory tract. Other symptoms of being exposed to heavy fungal contamination are allergy symptoms, reduced function of the immune system or digestive tract symptoms.

Such symptoms will occur when the content of fungal spores in indoor air reaches a threshold level depending on the fungal species contaminating the building. Numerous species of filamentous and yeast fungi have been isolated from damp buildings. Commonly found fungi include Botryderma spp., Penicillium spp., Cladosporidium spp., Aspergillus spp. and Sisotretrema spp., but other species may also be isolated such as eg Botrytis spp., Mucor spp., Fusarium spp., Alternaria spp. Epicoccum spp. and Phoma spp. However, the objective of the present invention is to inactivate any fungal species which may grow on indoor surfaces of building materials. Typically, the load of airborne fungal propagules including spores in damp buildings is in the range of $10^2$ to $10^5$ fungal colony forming units/m$^3$.

The primary sources of indoor airborne fungal contamination in damp buildings are fungal mycelia and spores associated with building material surfaces. Practically any surface of the building construction, whether it is a directly visible surface or a hidden, not immediately accessible surface such as in crawl spaces, may under conditions favouring development of fungal growth become contaminated. Fungal growth may also occur in the interface between building materials and covering materials such as beneath wall paper or other wall covering materials or beneath floorings such as carpets, linoleum and polymer-based floorings. Under particularly damp conditions, the fungal growth may develop to an extent where pronounced disfigurements of the materials occur.

The method according to the invention is suitable for treatment of both directly accessible (outer) surfaces and the above hidden building surfaces. However, it will be understood that in case of hidden building surfaces, it will generally be required to remove coverings, floorings or the building construction materials as such to expose the fungally contaminated surface prior to carrying out the method of the invention.

Like other living organisms, fungi require organic nutrients for growth. However, even purely inorganic materials in buildings may provide sufficient nutrients for fungal growth due to soiling or absorption of airborne organic particles.

Thus, materials where fungal contamination can be controlled using the method of this invention include purely inorganic materials, materials which are predominantly inorganic but comprising varying amounts of organic additives, and predominantly organic materials. The method of the invention can be applied not only to surfaces delimiting rooms in a building i.e. walls, ceilings, doors, windows and floors but also to surface materials in e.g. crawl spaces and accessible parts of ventilation systems. As used herein the term "surface" will include organic and/or inorganic surface coverings such as e.g. carpets, wall paper, plaster, organic paint including emulsion type paints, inorganic paints, varnishes, lacquers and any type of conventionally used building materials including gypsum boards, acoustic fibre boards, wood, plywood, concrete, roof construction surface, ceiling tiles such as tiles consisting of mineral fibre with a vinyl surface, glass fibre and materials comprising starch, paper fibre, clay, perlite, silica, styrene acrylic polymer and phenolic resins.

The method of the invention is, as it is mentioned above, based on the application onto a fungally contaminated building material surface of thermal energy in an amount which is sufficient to at least partially inactivate the fungal mycelia and spores but essentially without causing damages to the surface material.

During the experimentation leading to the present invention it was attempted to inactivate visible fungal growth on floor boards and ceiling plywood boards by subjecting these materials to a convection heat treatment in an oven at 100° C. for a period of time which did not cause damage to the materials (about 60 seconds). However, such a treatment was ineffective with regard to inactivation of fungal propagules.

In contrast hereto, it was found that treating such material surfaces carrying visually recognizable fungal growth with water vapour under pressure such as e.g. in excess of 2 bars being released to surfaces at a short distance and for a short period of time provided an amount of energy which effectively inactivate fungal propagules including spores.

Pressurized water vapour in its gaseous state will, as it is commonly known, when it is relieved of the pressure into an atmosphere at 1 bar will have a temperature of about 100° C. such as in the range of 90–110° C., the specific temperature depending on the ambient pressure. However, when released into air at ambient temperature it will cool momentarily and thereby be transformed into its liquid state. By this transition of the physical state of the water vapour an amount of thermal energy of about 2260 kJ/kg of water is released momentarily. This release of thermal energy is also referred to as condensation energy. It is assumed that this momentary and concentrated energy release represents the major contribution to the fungal inactivation effect which is observed herein. Accordingly, in one embodiment of the present method the thermal energy is derived from a transition of the state of the water vapour from the gaseous to the liquid state at a temperature in the range of 90–110° C.

In accordance with the method of the invention, the water vapour can conveniently be applied to the building surfaces by means of conventional vapour generating apparatuses. In typical designs, such apparatuses comprise a container or a tank to contain water under pressure, provided with electric heating means such as heating elements or heating coils, pressure valve means to obtain the desired vapour pressure, a tubing of metal or a flexible material to conduct the water vapour to an outlet of the tubing, which appropriately may be in the form of a nozzle element. It will be understood that the outlet dimensions of the nozzle element can be varied so as to provide release of a desired amount of the vapour per unit of time. It may be advantageous to provide the nozzle element with a piece of fabric encasing the nozzle or the nozzle element can suitably be provided with other cleaning means such as brushes.

The tank or container for receiving the water may suitably have a cubic content in the range of 1–50 litres such as in the range of 2–10 litres. The pressure valve means should be adjustable to provide suitable pressure levels such as in the range of 1–10 bar. The effect of the heating means can suitably be in the range of 1000 to 10,000 W.

In one effective embodiment of the invention. the method is one wherein the energy applied to the building material surface is in the range of 1–100 joules/cm$^2$/sec, including the range of 5–50 joules/cm$^2$/sec such as at least 10 joules/cm$^2$/sec. As an example, an amount of energy of about 40 joules/cm$^2$/sec can be applied when a vapour generating apparatus having a container with a cubic content of about 5 litres and a heating element effect of 2200 W is used at a water temperature of about 120° C., i.e. at a pressure in excess of 2 bar.

It has even been found that the thermal treatment according to the invention is highly effective with regard to fungal inactivation on uneven and irregular surfaces, assumingly due to an ability of the condensed vapour to penetrate into cracks and fissures on such surfaces.

In accordance with the method of the invention, the distance between the vapour outlet nozzle element and the contaminated surface to be treated should be relatively short, such as in the range of 0–10 cm. In preferred embodiments the distance should be less than 5 cm and in more preferred embodiments the vapour outlet is in contact with the surface.

The appropriate period of time where the vapour is applied to the building surface material depends on several factors, including the level of fungal contamination, the type of material and the surface structure hereof and the initial temperature of the vapour. Evidently, a rough surface may require a more prolonged treatment than a smooth surface, which treatment, however, should not be prolonged beyond the point where damages of the material in question occur. It was found in experiments that e.g. treating a wooden surface with visually recognizable fungal growth having an area of 40 cm$^2$ for a total of about 5 sec completely inactivated fungal propagules. In suitable embodiments of the invention the thermal energy is applied to the surface for a period of time which is in the range of 0.01–60 sec/cm$^2$ including a range of 0.125–10 sec/cm$^2$. However, it is envisaged that particularly contaminated or particularly rough surfaces may require a more prolonged treatment, i.e. in excess of 60 sec/cm$^2$.

Preferably, the thermal treatment parameters should be selected so as to inactivate or kill essentially all fungal material able to propagate, i.e. propagules including spores and conidia. Accordingly, the present method is preferable one which results in killing of at least 90% of fungal propagules initially present on the building material surface. Such an inactivation rate will result in a significant reduction of the content of fungal spores in the indoor air which, as it is mentioned above, in damp buildings typically can be in the range of $10^2$ to $10^5$ fungal colony forming units/m$^3$. A desired reduction of the air contamination is a reduction by a factor of 10–10,000 such as 100 to 1000.

In order to obtain the above high rates of fungal inactivation it may be advantageous to subject the material surface to a pre-treatment step whereby fungal material present is at least partially removed from said surface. Such a pretreatment may be a conventional cleaning procedure using a liquid cleaning medium or it may be a vacuum cleaning step. Accordingly, in another preferred embodiment of the invention, the method includes such a pre-treatment.

Furthermore, it is contemplated that droplets of condensed water vapour when applied to the fungally contaminated material surface will effectively entrap fungal spores and other propagules. Accordingly, subsequent removal of such spore-carrying droplets e.g. by vacuum cleaning may be a further measure contributing to the control of indoor air fungal contamination. Therefore, the invention encompasses in a useful aspect an embodiment which comprises the further step of removing from the energy treated building material surface droplets of condensed water vapour entrapping fungal mycelia and/or spores. This may conveniently be obtained by a vacuum cleaning subsequent to the thermal treatment, optionally using a vacuum cleaner provided with a filter to retain fungal propagules.

Although it is preferred to use a method as described herein in which the thermal energy is delivered to the material surface in the form of heated pure water vapour, it is envisaged that it may under specific conditions be advantageous to add to the water in the vapour generating apparatus one or more additives which can contribute to the inactivation of fungal materials. Such possible additives include as examples, surface active substances including soap and detergents, environmentally acceptable fungistatic or fungicidal compounds, alcohols and salts.

The invention is further illustrated by the following examples.

EXAMPLE 1
Inactivation of Fungi on Floor Boards

A floor board, 100×13 cm with intensive and visually recognizable growth of fungi was collected from a damp building. The surface of the board was pre-treated by vacuum cleaning followed by applying water vapour generated by a Mondial VAP™ 3000 vapour generating apparatus providing vapour at 130° C. at the nozzle. The treatment period was about 65 sec for the entire floor board.

Prior to the pre-treatment, the level of viable fungal propagules on the floor board surface and the species composition hereof was recorded by pressing a fungus cultivation medium in a petri dish onto the fungally contaminated board followed by incubation of the medium at 30° C. for 5 days. After this incubation, the medium surface was completely covered by colonies of fungi. The distribution of fungal species growing on the medium was: Botryderma spp. 65%, Aspergillus spp. 30% and Penicillium spp. 5%.

Similarly, print samples of the board after the treatment was collected (3 samples evenly distributed over the board surface) and these samples were incubated as above. None of these 3 samples revealed growth of fungi. Only a few colonies of bacteria were observed (Micrococcus spp.).

It could therefore be concluded that the above thermal energy treatment had resulted in a complete inactivation of fungal propagules on the heavily contaminated floor board.

The above experiment was repeated using an other floor board from the same building. The results were essentially the same.

EXAMPLE 2
Decontamination of Fungally Contaminated Wooden Materials from a Damp Mouldy Building Samples were collected of three different types of wooden materials from the building which has been empty for about one year. The samples which were all visibly contaminated with fungi were: six roof plywood sheets, five floor boards and one wooden beam. The samples were examined for microfungal contamination prior to treatment by using print or contact plates containing V-8 medium which is a selective medium for fungi. Two contact plates were used for each sample. Following the contact sampling, the plates were incubated at about 250C for 5–7 days and then examined qualitatively and semi-quantitatively for growth of fungi. The fungi appearing on the plates were identified, in most cases to genus level but for some to species level using standard taxonomic criteria.

The fungi detected on the samples were common airborne and dust borne fungal species and certain members of fungal groups commonly found in buildings in which damage caused by burst water pipes has occurred.

The samples were pre-treated and heat treated essentially as described in Example 1 and subsequently kept in sterile petri dishes at 20–22° C. with access of ambient air but without supply of moisture. Contact sampling as described above was repeated at the following points of time: immediately after treatment, two weeks after treatment and three months after treatment.

The results of the microbiological examination of the samples are summarized in the below Tables 1–3.

TABLE 1

Microbiological examination of plywood sheets using contact plates. Detection of microfungi.

| Sheet No. | Time of sampling | Contact plate 1 | Contact plate 2 |
|---|---|---|---|
| 1 | Prior to treatment | Moderate growth Penicillium spp. Ulocladium spp. *Mycelia sterilia* | Moderate growth Penicillium spp. *Mycelia sterilia* |
|  | Immediately after treatment | No growth | No growth |
|  | 2 weeks after treatment | No growth | No growth |
|  | 3 months after treatment | No growth | No growth |
| 2 | Prior to treatment | Moderate growth Alternaria spp. Penicillium spp. | Moderate growth Alternaria spp. Penicilliuim spp. *Trichosporon pullulans* |
|  | Immediately after treatment | No growth | No growth |
|  | 2 weeks after treatment | No growth | No growth |
|  | 3 months after treatment | No growth | Sparse growth Penicillium spp. |
| 3 | Prior to treatment | Extensive growth Penicillium spp. *Mycelia sterilia* | No growth |
|  | Immediately after treatment | No growth | No growth |
|  | 2 weeks after treatment | No growth | No growth |
|  | 3 months after treatment | No growth | Sparse growth Yeast |
| 4 | Prior to treatment | Moderate growth Penicillium spp. *Mycelia sterilia* | Moderate growth Alternaria spp. |
|  | Immediately after treatment | No growth | No growth |
|  | 2 weeks after treatment | No growth | No growth |
|  | 3 months after treatment | No growth | No growth |

TABLE 1-continued

Microbiological examination of plywood sheets using contact plates. Detection of microfungi.

| Sheet No. | Time of sampling | Contact plate 1 | Contact plate 2 |
|---|---|---|---|
| 5 | Prior to treatment | Moderate growth<br>Penicillium spp.<br>*Mycelia sterilia* | Moderate growth<br>Yeast<br>Penicillium spp. |
|   | Immediately after treatment | No growth | No growth |
|   | 2 weeks after treatment | No growth | No growth |
|   | 3 months after treatment | No growth | No growth |
| 6 | Prior to treatment | Extensive growth<br>Penicillium spp. dominate<br>Acremonium spp.<br>Scopulariopsis spp.<br>Ulocladium spp.<br>*Mycelia sterilia* | Extensive growth<br>Alternaria spp.<br>Penicillium spp.<br>*Mycelia sterilia* |
|   | Immediately after treatment | No growth | No growth |
|   | 2 weeks after treatment | No growth | No growth |
|   | 3 months after treatment | No growth | Sparse growth<br>*Mycelia sterilia* |

TABLE 2

Microbiological examination of floor boards using contact plates. Detection of microfungi.

| Board No. | Time of sampling | Contact plate 1 | Contact plate 2 |
|---|---|---|---|
| 1 | Prior to treatment | Sparse growth<br>Penicillium spp. | Sparse growth<br>Chaetomium spp. |
|   | Immediately after treatment | No growth | No growth |
|   | 2 weeks after treatment | No growth | No growth |
|   | 3 months after treatment | No growth | No growth |
| 2 | Prior to treatment | Sparse growth<br>Penicillium spp. | Sparse growth<br>*Mycelia sterilia* |
|   | Immediately after treatment | No growth | No growth |
|   | 2 weeks after treatment | No growth | No growth |
|   | 3 months after treatment | No growth | No growth |
| 3 | Prior to treatment | Sparse/moderate growth<br>Penicillium spp.<br>*Mycelia sterilia* | Sparse/moderate growth<br>Penicillium spp.<br>*Mycelia sterilia* |
|   | Immediately after treatment | No growth | No growth |
|   | 2 weeks after treatment | No growth | No growth |
|   | 3 months after treatment | No growth | No growth |
| 4 | Prior to treatment | Moderate growth<br>Alternaria spp.<br>*Aspergillus ochraceus*<br>Penicillium spp.<br>*Mycelia sterilia* | Moderate growth<br>Chaetomium spp.<br>*Mycelia sterilia* |
|   | Immediately after treatment | No growth | No growth |
|   | 2 weeks after treatment | No growth | No growth |
|   | 3 months after treatment | No growth | No growth |
| 5 | Prior to treatment | Sparse growth<br>*Aureobasidium pullulans*<br>*Rhizopus nigricans*<br>*Stachybotrys chartarum*<br>*Mycelia sterilia* | Sparse growth<br>Aspergillus spp.<br>*Mycelia sterilia* |
|   | Immediately after treatment | No growth | No growth |
|   | 2 weeks after treatment | No growth | No growth |
|   | 3 months after treatment | No growth | No growth |

TABLE 3

Microbiological examination of wooden beam using contact plates. Detection of microfungi.

| Time of sampling | Contact plate 1 | Contact plate 2 |
|---|---|---|
| Prior to treatment | Extensive growth<br>Penicillium spp. dominate<br>*Mycelia sterilia* | Extensive growth<br>Penicillium spp. dominate<br>Aspergillus spp.<br>*Mycelia sterilia* |

TABLE 3-continued

Microbiological examination of wooden beam using contact plates. Detection of microfungi.

| Time of sampling | Contact plate 1 | Contact plate 2 |
| --- | --- | --- |
| Immediately after treatment | No growth | No growth |
| 2 weeks after treatment | No growth | No growth |
| 3 months after treatment | Sparse growth Phoma-like | Sparse growth Chaetomium spp. |

Prior to the treatment, two out of six plywood sheets showed extensive fungal contamination and the remaining four sheets moderate contamination; one out of five floor boards was moderately contaminated and four were sparsely contaminated; and the wooden beam was extensively contaminated.

Immediately after treatment and two weeks after treatments, no microfungal contamination could be detected on any of the samples. Three months after treatment sparse fungal growth was detected on a few of the contact plate samples. However, in no instance was this fungal growth after three months of keeping the treated samples macroscopically detectable.

Thus, it could be concluded that the applied thermal energy treatment had resulted in a removal and/or inactivation of the fungal growth on and/or below the surfaces of the examined building materials removed from a damp building and that fungal growth did not reappear within two weeks even if the samples were kept under conditions permitting fungal propagules to begin to grow.

What is claimed is:

1. A method of improving the indoor air quality in a building whose occupant has or occupants have symptoms ascribable to fungal contamination, the method comprising applying onto a building material surface, which includes fungal mycelia and spores, at least 10 joules/cm$^2$/sec of thermal energy initially contained in water vapour at a pressure exceeding 1 bar, in an amount which is sufficient to at least partially inactivate said fungal mycelia and spores but substantially without causing damage to a surface material.

2. A method according to claim 1 wherein there is visually recognizable fungal growth on the building material surface, prior to the application of the thermal energy.

3. A method according to claim 1 wherein the thermal energy is applied by releasing pressurized water vapour onto the building material surface whereby the thermal energy is derived from a transition of the state of the water vapour from the gaseous to the liquid state at a temperature in the range of 90–110°C.

4. A method according to claim 3 wherein the thermal energy is applied to the building material surface by releasing the water vapour to the building material surface at a distance from said building material surface which is at the most 10 cm.

5. A method according to any of claims 1–4 wherein the thermal energy is applied to the building material surface for a period of time which is in the range of 0.01–60 sec/cm$^2$.

6. A method according to claim 1. wherein the building material surface is selected from a roof construction surface, a ceiling, a floor, a surface defining a crawl space, a wall surface and a surface which is not immediately accessible.

7. A method according to claim 6 wherein the building material surface is provided with a surface covering including a covering comprising an organic substance.

8. A method according to claim 1 which results in killing of at least 90% of fungal propagules initially present on the building material surface.

9. A method according to claim 1 which comprises as a pretreatment of the building material surface a step whereby fungal material is at least partially removed from said surface.

10. A method according to claim 1 which comprises the further step of removing from the thermal energy treated building material surface droplets of condensed water vapour entrapping fungal mycelia and/or spores.

11. A method according to claim 1 which reduces the content of fungal spores in the indoor air by a factor of 10 to 10,000.

12. A method according to claim 1 which reduces the content of fungal spores in the indoor air by a factor of 100 to 1,000.

13. A method according to claim 1 which comprises applying onto said building material surface thermal energy initially contained in water vapour at a pressure exceeding 2 bars.

14. A method of improving the indoor air quality in a building whose occupant has or occupants have symptoms ascribable to fungal contamination, the method comprising applying onto a building material surface, which includes fungal mycelia and spores, thermal energy initially contained in water vapour at a pressure exceeding 1 bar, for a period of time which is in the range of 0.01–60 sec/cm$^2$ and in an amount which is sufficient to at least partially inactivate said fungal mycelia and spores but substantially without causing damage to a surface material.

15. A method according to claims 13 or 14 which effectively inactivates fungal propagules, including spores.

16. A method according to claim 1 which comprises applying onto said building material surface thermal energy initially contained in water vapour at a pressure of 1 to 10 bar.

17. A method according to claim 1 conducted under parameters selected to inactivate or kill substantially all fungal material able to propagate.

18. A method according to claim 17 wherein the fungal material able to propagate includes spores and conidia.

19. A method according to claim 1, wherein the thermal energy is applied to the building material surface by releasing the water vapour to the building material surface at a distance of 0 to 10 cm from said building material surface.

20. A method according to claim 1, wherein the thermal energy is applied to the building material surface by releasing the water vapour to the building material surface at a distance of less than 5 cm from said building material surface.

21. A method according to claim 1, which decreases the content of fungal spores in indoor air to below a threshold level which causes symptoms associated with fungal contamination.

22. A method of improving the indoor air quality in a building whose occupant has or occupants have symptoms ascribable to fungal contamination, the method comprising applying onto a building material surface, which includes fungal mycelia and spores, thermal energy initially contained in water vapour at a pressure exceeding 1 bar, in an amount which is sufficient to at least partially inactivate said fungal mycelia and spores but substantially without causing damage to a surface material, the thermal energy being applied by releasing pressurized water vapour to the building material surface at a distance from the building material surface which is at the most 10 cm, whereby the thermal energy is derived from a transition of the state of the water vapour from the gaseous to the liquid state at a temperature in the range of 90–110° C.

23. A method of improving the indoor air quality in a building whose occupant has or occupants have symptoms ascribable to fungal contamination, the method comprising applying onto a building material surface, which includes fungal mycelia and spores and visually recognizable fungal growth, thermal energy initially contained in water vapour at a pressure exceeding 1 bar, in an amount which is sufficient to at least partially inactivate said fungal mycelia and spores but substantially without causing damage to a surface material, the thermal energy being applied by releasing pressurized water vapour to the building material surface at a distance from the building material surface which is at the most 10 cm, whereby the thermal energy is derived from a transition of the state of the water vapour from the gaseous to the liquid state at a temperature in the range of 90–110° C.

24. A method of improving the indoor air quality in a building whose occupant has or occupants have symptoms ascribable to fungal contamination, the method comprising applying onto a building material surface, which includes fungal mycelia and spores, thermal energy initially contained in water vapour at a pressure exceeding 2 bars, in an amount which is sufficient to at least partially inactivate said fungal mycelia and spores but substantially without causing damage to a surface material.

25. A method of improving the indoor air quality in a building whose occupant has or occupants have symptoms ascribable to fungal contamination, the method comprising applying onto a building material surface, at a distance of 0 to 10 cm from the building material surface which includes fungal mycelia and spores, thermal energy initially contained in water vapour at a pressure exceeding 1 bar, in an amount which is sufficient to at least partially inactivate said fungal mycelia and spores but substantially without causing damage to a surface material.

26. A method of improving the indoor air quality in a building whose occupant has or occupants have symptoms ascribable to fungal contamination, the method comprising applying onto a building material surface, at a distance of less than 5 cm from the building material surface which includes fungal mycelia and spores, thermal energy initially contained in water vapour at a pressure exceeding 1 bar, in an amount which is sufficient to at least partially inactivate said fungal mycelia and spores but substantially without causing damage to a surface material.

* * * * *

UNITED STATES PATENT AND TRADEMARK OFFICE
CERTIFICATE OF CORRECTION

PATENT NO. : 6,187,263 B1
DATED : February 13, 2001
INVENTOR(S) : Klaus Nielsen

Page 1 of 1

It is certified that error appears in the above-identified patent and that said Letters Patent is hereby corrected as shown below:

Title page,

Column 1,
Line 22, delete "Feb. 7, 1998" and replace with --Feb. 7, 1997--.

Signed and Sealed this

Fourteenth Day of August, 2001

Attest:

*Attesting Officer*

NICHOLAS P. GODICI
*Acting Director of the United States Patent and Trademark Office*